May 1, 1923.
A. R. ULP
1,453,421
SPRING LUBRICATING PROTECTOR
Filed Oct. 29, 1921
4 Sheets-Sheet 1
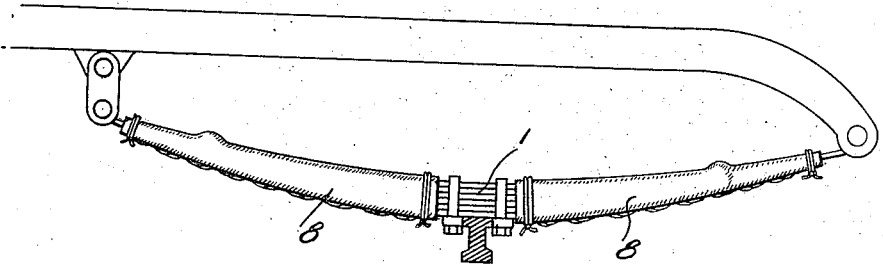
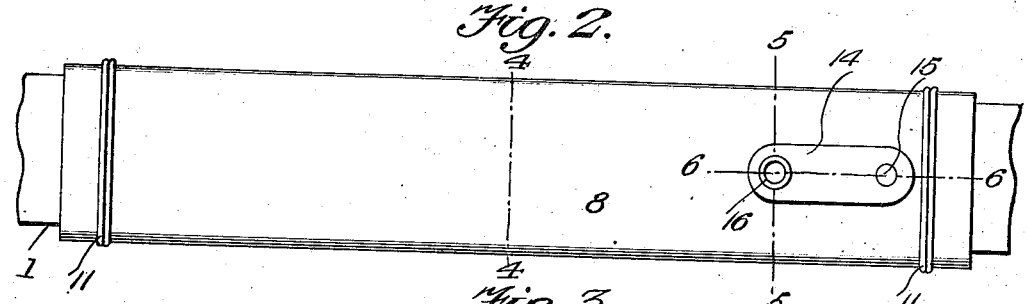
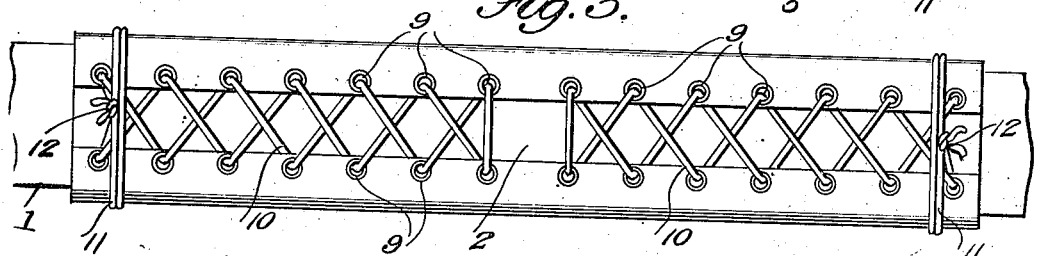
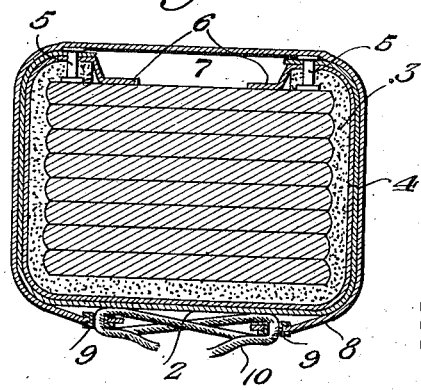
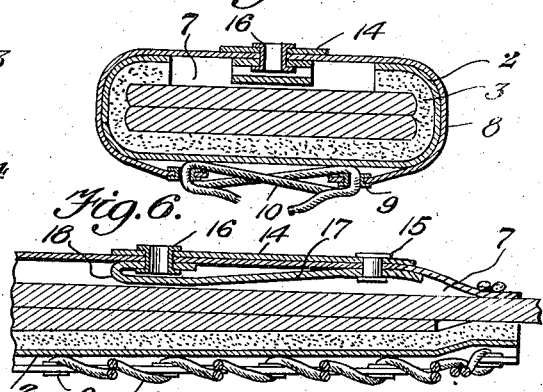
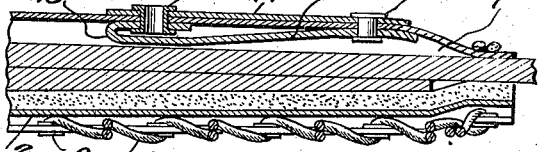
Inventor
Alfred R. Ulp
By Victor J. Evans
Attorney
Witnesses May 1, 1923.

A. R. ULP 1,453,421

SPRING LUBRICATING PROTECTOR

Filed Oct. 29, 1921

Witnesses

Inventor
Alfred R. Ulp
By Victor J. Evans
Attorney

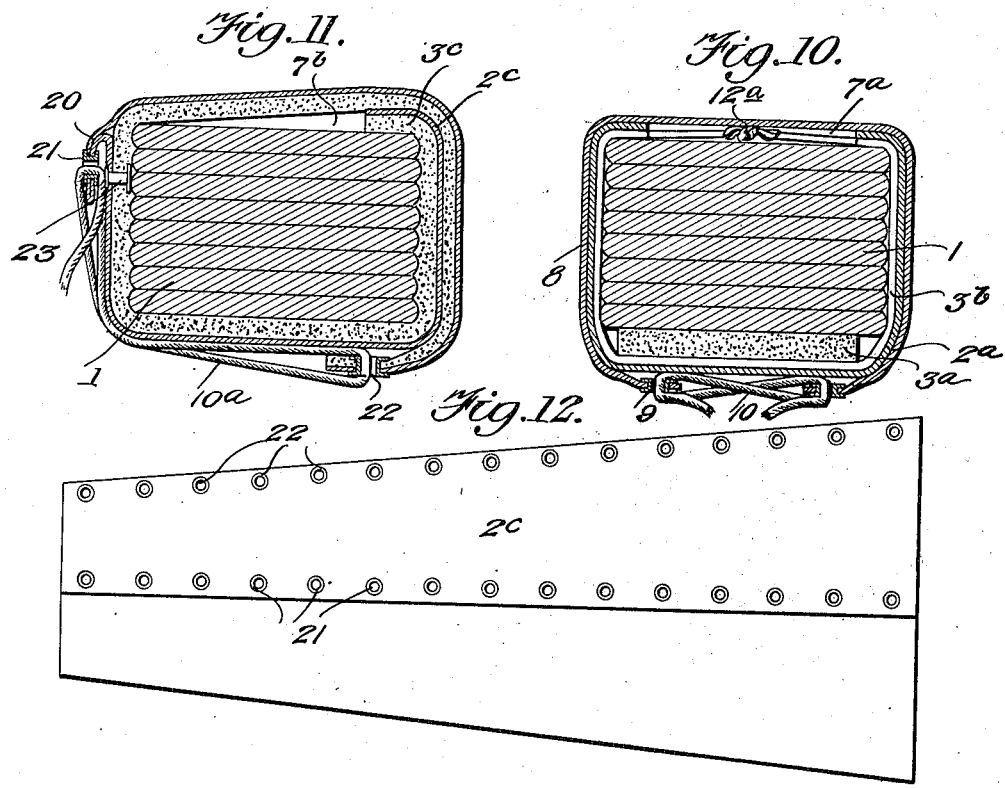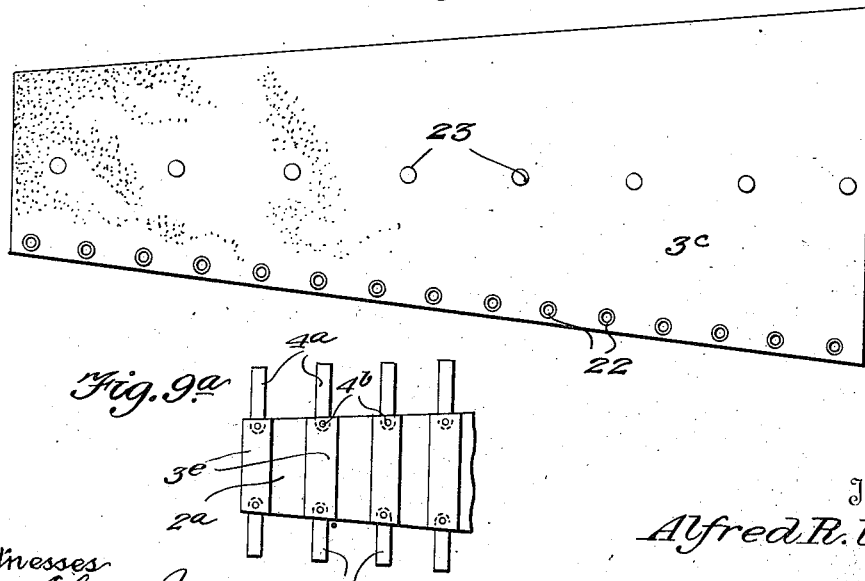

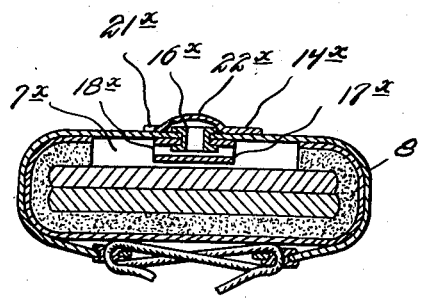
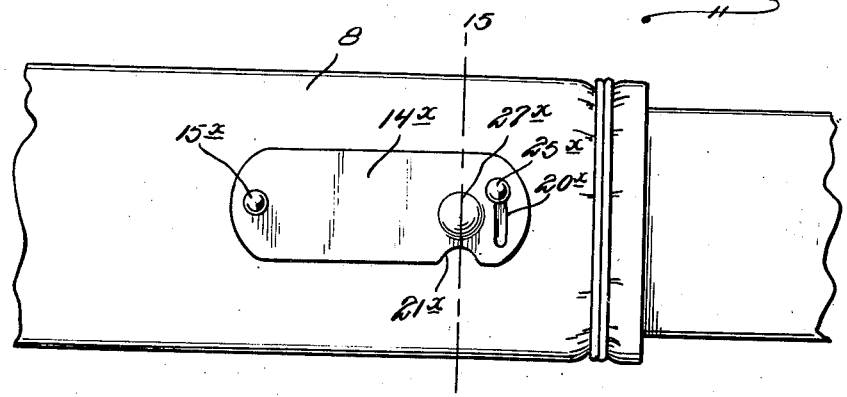
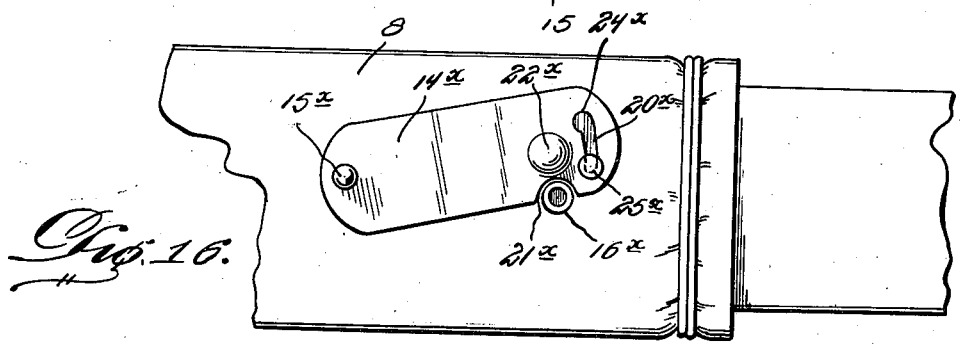

Patented May 1, 1923.

1,453,421

UNITED STATES PATENT OFFICE.

ALFRED R. ULP, OF PASADENA, CALIFORNIA.

SPRING LUBRICATING PROTECTOR.

Application filed October 29, 1921. Serial No. 511,308.

*To all whom it may concern:*

Be it known that I, ALFRED R. ULP, a citizen of the United States, residing at Pasadena, in the county of Los Angeles and State of California, have invented new and useful Improvements in Spring Lubricating Protectors, of which the following is a specification.

The object of my said invention is the provision of a spring lubricating protector susceptible of ready application to a spring, adapted to be expeditiously and easily supplied with lubricant and also adapted to confine and prevent waste of the lubricant and to supply the same to the best advantage to a spring, and possessed of the capacity of retaining the lubricant in intimate contact with all portions of the spring while effectively excluding dust and dirt and moisture.

Other objects and practical advantages of the invention will be fully understood from the following description and claims when the same are read in connection with the drawings, accompanying and forming part of this specification, in which:—

Figure 1 is an end elevation illustrating two of my novel protectors as properly applied to a vehicle spring.

Figure 2 shows in top plan one of the protectors as applied.

Figure 3 is an inverted plan view of the same.

Figures 4, 5, and 6 are enlarged detail vertical sections taken in the planes indicated by the lines 4—4, 5—5 and 6—6, respectively, of Figure 2.

Figure 7:
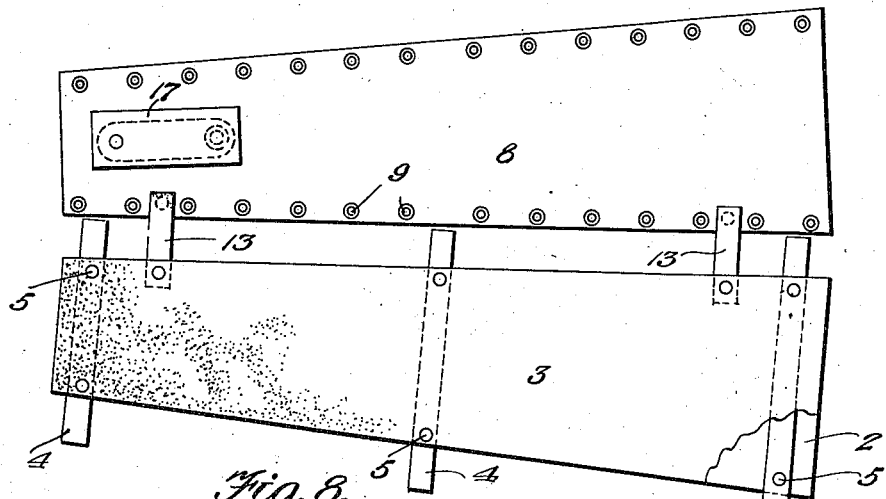

Figure 7 is an inside view of the protector as it appears when removed from a spring or precedent to being supplied with laces for its fastening on a spring, the said view being on a reduced scale.

Figure 8:
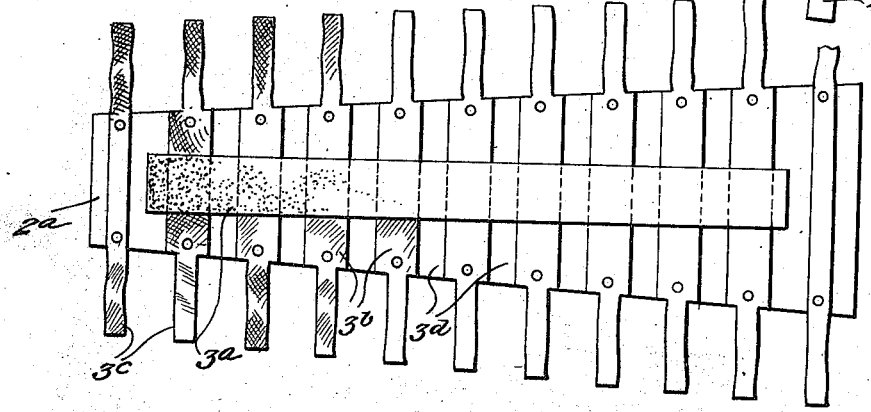

Figure 8 is an inside view of a modified protector member.

Figure 9:
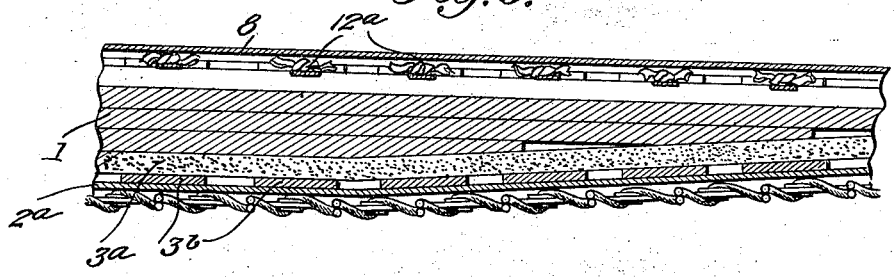

Figure 9 is a longitudinal vertical section showing as applied to a spring the construction embodying the said member of Figure 8.

Figure 9ª is a view showing a slight modification of the member shown in Figure 8.

Figure 10 is an enlarged transverse section illustrative of the construction shown in Figure 9.

Figure 11 is a transverse section of another modification.

Figure 12 is a plan view showing the outer side of the protector comprised in said construction.

Figure 13 is an inner side of the said protector.

Figures 14, 15 and 16 are views of a modification hereinafter explicitly referred to.

Similar numerals designate corresponding parts in Figures 1 to 7 to which reference will first be made.

The spring 1 is of ordinary well known type, and in the illustrated embodiment of my invention the spring is shown as equipped with two of my novel spring lubricating protectors or boots. The said protectors or boots are identical in construction, and therefore, a detailed description of the one illustrated in Figures 2 to 7 will suffice to impart a definite understanding of both. Among other elements the boot referred to comprises a body or container member 2 of oil cloth or any other flexible material compatible with its purpose, the said body 2 being designed to hold and prevent waste of lubricant. The body 2 rests at the bottom and at the sides of the adjacent spring portion and laps to a certain extent above the spring portion. It is provided with a lining 3 of felt or any other absorbent material suitable to the purposes. It is also provided at intervals with strips 4 of pliable metal which are interposed between the body 2 and the felt lining 3 and are connected to the same by rivets 5. The metallic strips 4 extend beyond the edges of the body 2 and absorbent lining 3 and are designed to be bent downwardly on the spring portion as designated by 6 in Figure 4, this with a view to assisting in snugly holding the body 2 on the spring portion 1 in such manner that a reservoir 7 for lubricant is afforded at the upper side of the spring practically throughout the length of the boot.

In addition to the body 2 which is applied to the spring portion from below upwardly, the boot comprises an upper or telescopic member 8 of oil cloth or any other material flexible in character and possessed of the characteristics necessary in a spring boot. The said upper and telescopic member 8 is provided adjacent to its edges with eyelets 9, and it is designed to be secured in position on a spring portion through the medium of laces 10, two to each body. The said laces 10 are laced from points adjacent to and at opposite sides of the transverse median line of the boot, and their end portions are wrapped tightly about the end portions of the boot, as designated by 11, and are tied, as designated by 12, Figure 3, so that the end portions of the boot are tightly closed, and lubricant is prevented from exuding therefrom and at the same time dust and dirt and moisture are effectively prevented from gaining access to the interior of the body. As best shown in Figure 7 I prefer to connect the body 2 and the telescopic member 8 through the medium of flexible interposed tabs 13, in order that the boot may be handled with more facility as a unit.

It will be readily appreciated from the foregoing that my novel boot is susceptible of being expeditiously and easily applied to a spring portion, by wrapping or otherwise applying first the body 2 and then the telescopic or outer member 8 about the spring portion, and then tightly lacing the telescopic or outer member 8 and tightly wrapping the end portions of the laces 10 about the end portions of the boot and tying the ends of the said laces. At this point I would have it understood that it is within the purview of my invention to supply the lining 3 with lubricant prior to the application of the boot to a spring portion, and when the boot is properly applied to the spring portion it will be noted that the absorbent lining 3 at the bottom and sides of the spring portion will give off lubricant and adequately supply the same to the bottom and sides of the spring. I would also have it understood that it is within the purview of my said invention to supply the reservoir 7 with lubricant precedent to the application of the outer or telescopic member 8, and when the said reservoir 7 is supplied with lubricant before the member 8 is applied or after the application of the said member 8, it will be noted that the lining 3 will be kept impregnated with lubricant at all times so that all portions of the spring will be supplied with lubricant so long as there is lubricant in the boot.

All leakage of lubricant from the boot is precluded by the relative arrangement of the outer member 8 to the body 2, and the compression of the end portions of the boot due to the described wrapping and tying of the end portions of the laces 10. It follows from this that dust and dirt and moisture will also be effectively excluded from the boot.

I prefer to employ but do not desire to be understood as restricting myself to the employment of means carried by the outer or telescopic member 8 for rendering it easy to replenish the supply of lubricant in the reservoir 7 while the boot is in working position. The means alluded to is clearly illustrated in Figures 2, 5 and 6 and comprises among other elements a name plate 14 at the outer side of the member 8. At one end the said name plate is connected to the member 8 by a blind rivet 15, and at its opposite end the plate is connected to the member 8 by an open rivet or eyelet 16, designed to serve as a duct for the introduction of lubricant. The said rivet 15 and eyelet 16 also serve to connect to the member 8 a flexible strip 17, Figures 5 and 6 which is bent upon itself at 18 and rests opposite to and in spaced relation from the duct or eyelet 16 so that it does not interfere with the passage of the lubricant from the eyelet or duct 16 into the reservoir 7, but prevents splashing of lubricant out through the said duct. It will also be appreciated at this point that the strip 17 is calculated to serve as a dust and moisture catcher—i. e., to receive and retain any dust or moisture that may find its way through the duct 16, it being understood in this connection that the strip 17 is preferably of absorbent material. I would also have it understood that the strip 17 is not necessarily of absorbent material since when coated with oil it will serve as an adequate dust catcher irrespective of the material of which it is formed. When desired the plate 14 may be used to receive the name of the owner of a car or may be utilized to bear a trademark or trade name in the discretion of the manufacturer, and it will further be noted that the plate 14 lends increased strength and durability to the attachment of the strip 17.

In Figure 8 I illustrate a modified body or lower member $2^a$ designed, and adapted to be employed in combination with the upper and outer or telescopic member 8. The said body $2^a$ is shown in Figures 9 and 10 as applied to a spring portion 1, and by comparison of Figures 8, 9 and 10 said body member $2^a$ will be understood as equipped with a longitudinal absorbent strip $3^a$ and with spaced transverse absorbent strips $3^b$, the said strips $3^b$ being comparatively thin and being interposed between the strip $3^a$ and body $2^a$ and being riveted to the body $2^a$ and terminating in reduced end portions $3^c$. The said end portions $3^c$ are designed to be tied at the top of or at any other point relative to the spring portion 1 as designated by $12^a$ in Figure 10, and it will also be noted that the spacing of the transverse strips $3^b$ affords between said strips transverse ducts $3^d$ which may be depended upon to adequately conduct lubricant from the space 7ª above the spring portion 1 down the sides and to the bottom of the body 2ª where the lubricant will be absorbed by the strip 3ª. It will also be manifest from Figure 10 that the modified body 2ª is well adapted for use in combination with the upper or outer member 8 before described.

In the slight modification shown in Figure 9ª the construction of the body 2ª is the same as in Figure 8 with the exception that instead of providing the transverse strips 3ᵇ with reduced end portions 3ᶜ, the said strips which are designated 3ᵉ in Figure 9ª are arranged with their ends flush with the edges of the body 2ª, and thin metal strips 4ª are secured at 4ᵇ to the body 2ª and strips 3ᵉ, and are designed to be used in the same manner as the end portions 6 of the metallic strips 4 shown in Figures 4 and 7. All of the absorbent strips manifestly may be formed of wicking.

In Figures 11, 12, and 13 I illustrate another modification in which a reservoir 7ᵇ is afforded at the top of the spring portion 1. This modification includes a body 2ᶜ of oil cloth or other appropriate flexible material. The said body 2ᶜ is lined with absorbent material 3ᶜ, and is provided with a lapped portion 20 at an intermediate point in its width, the said lapped portion having its thicknesses secured together by a row of eyelets 21, Figures 11 and 12. It will also be noted that adjacent to one of its edges the body 2ᶜ is provided with a row of eyelets 22. The lining 3ᶜ is permanently connected to the body 2ᶜ preferably through the medium of a row of rivets indicated by 23 in Figures 11 and 13.

In the application of the boot shown in Figures 11, 12 and 13 to the spring portion, the boot is wrapped as shown in Figure 11 about the spring portion, and one or more laces 10ª are employed to tightly secure the boot about the spring portion, and when two laces are employed in combination with the boot the said laces are preferably arranged in the manner and for the purpose hereinbefore described with particular reference to Figures 2 and 3.

In the embodiments shown in Figures 9, 10 and 11 as well as in the embodiment shown in Figures 1 to 6, it will be observed that all of the salient features of my invention are present, viz; the reservoir above the spring portion, the absorbent lining within the boot body and at the bottom and sides of the spring portion, and the arrangement of the body relatively to the spring portion, whereby the body is adapted to serve as a receptacle or holder for the retention of the lubricant in intimate contact with the spring.

It will also be observed that in all of the said embodiments the lubricant is free to collect in the lower portion of the protector or boot body and be transferred from the lower portion of the body by capillary attraction to the sides and top of the spring portion.

In Figures 14, 15 and 16 I illustrate a modification of the means 14, 15 and 16 of Figures 2 and 6. According to the said modification, Figures 14, 15 and 16, the name plate 14ˣ is pivotally connected to the member 8 by a rivet 15ˣ, and the said member 8 is provided at 16ˣ with an eyelet that forms a duct for the entrance of lubricant. The said rivet 15ˣ and eyelet 16ˣ also serve to connect to the member 8 a flexible strip 17ˣ which is bent upon itself at 18ˣ and rests opposite to and in spaced relation from the duct or eyelet 16ˣ so it does not interfere with the entrance of lubricant through the duct 16ˣ into the reservoir 7ˣ, but prevents splashing of lubricant out through the said duct.

The plate 14ˣ serves the purposes of a name plate and a swinging or shifting exterior cover for the protection of the duct 16ˣ. When said plate is closed or swung over the duct 16ˣ it precludes the entrance of moisture and dirt. I provide the plate 14ˣ near its swinging end with a curvilinear slot 20ˣ, and I also provide the said plate 14ˣ with an edge notch 21ˣ, and an exterior swell 22ˣ, the slot 20ˣ, being provided at its end remote from the notched edge with a seat or offset 24ˣ for cooperation with the shank or body of a headed rivet 25ˣ, carried by the member 8 and extending through the said curvilinear or arcuate slot. The rivet shank fits the slot and frictionally engages that side of the slot which is adjacent to the before mentioned swell. The offset of the arcuate slot is at the side of the slot adjacent to the center of movement of the plate 14ˣ, and the swell alluded to serves as a stop against the free motion of the rivet shank passing the offset point or tending to pass the said point. From this it follows that the rivet will operate to hold the end of the plate 14ˣ in place and will guide the plate when the same is being opened or closed. It will also be noted that the offset mentioned relieves the rivet shank from tension when the plate 14ˣ is in closed position, and contributes toward preventing casual opening of the said plate 14ˣ. Manifestly incident to closing of the plate 14, the rivet shank will bear frictionally against the inner wall of the arcuate slot until the offset is coincident with the rivet shank when the shank will enter the said offset, and will remain there until pressure is applied to open the plate 14ˣ and uncover the eyelet or duct 16ˣ. The said rivet is preferably fastened in a slightly free manner so as to be adapted to freely shift from a closed to an open position and vice versa. The swell alluded to by the cooperation with the end of the eyelet and by its adaptibility to fit over the rim of the eyelet, contributes materially in preventing accidental opening of the plate 14ˣ. The notch in the edge of the plate 14<sup>x</sup> permits uncovering of eyelet 16 notwithstanding a very short slot is employed in the plate.

Having described my invention, what I claim and desire to secure by Letters-Patent, is:—

1. A spring lubricating protector having a flexible body and an absorbent lining adapted to rest at the bottom and sides of a spring portion; the said protector being secured on a spring portion by laces extending outwardly from points adjacent to the transverse median line of the protector, and the said laces being wrapped and tied around the end portions of the protector to secure the laces and to compress the said end portions.

2. A spring lubricating protector having a flexible body and an absorbent lining adapted to rest at the bottom and sides of a spring portion, in combination with an upper telescopic member adapted for arrangement over the body and to be secured below the body and a spring portion to which the body is applied; the said securing of the telescopic member being effected by laces extending outwardly from points at opposite sides of the transverse median line of the protector and wrapped and tied about the end portions of the protector to secure the laces and to compress the said end portions.

3. A lubricating spring protector comprising a body having a lining of absorbent material and also having metallic strips to secure its edge portions above a spring portion, in combination with an upper telescopic member adapted to be secured over the body and a spring portion bearing the same whereby a reservoir will be afforded above the spring portion, the said telescopic member being supplied with eyelets, and being equipped with laces that extend outwardly from points at opposite sides of its transverse median line and are adapted to be wrapped tightly about the end portions of the protector and tied to secure the laces and to compress the said end portions.

4. A lubricating spring protector comprising a body having a lining of absorbent material and also having metallic strips to secure its edge portions above a spring portion, in combination with an upper telescopic member adapted to be secured over the body and a spring portion bearing the same whereby a reservoir will be afforded above the spring portion; the said telescopic member being equipped with a name plate, rivets securing the same to the member, one of said rivets being of duct form, and a strip bent upon itself and opposed to the inner end of the duct-like rivet and connected by the rivets to the telescopic member.

5. A spring lubricating protector comprising a body with an absorbent lining and spaced metallic strips connected to and extending beyond the edges of the body and lining, a telescopic covering member with eyelets, and tabs of flexible character interposed between and connecting the said body and the said telescopic member.

6. A spring protector member equipped with a name plate, and with a lubricant duct, and a strip bent upon itself and opposed to the inner end of the duct and connected to the member by the said duct and by means serving the additional purpose of connecting the plate to the member.

7. The combination of a spring protector member, a swinging plate pivotally connected thereto, an eyelet forming a lubricant duct in said member, and a strip within the member and connected by said eyelet and said pivotally connecting means to the member, the plate serving in one position to cover the eyelet.

8. The combination of a spring protector member, a swinging plate pivotally connected thereto, an eyelet forming a lubricant duct in said member, and a strip within the member and connected by said eyelet and said pivotally connecting means to the member, the plate serving in one position to cover the eyelet; the said plate having an edge notch and also having a swell opposite the notch, and further having an arcuate slot with an offset at the end thereof removed from the notch, and a headed rivet extending through the slot and adapted to cooperate with the plate in holding the movable end of the plate to the member, the plate being formed of resilient material.

9. In a spring protector, the combination of a member, a resilient plate pivotally connected thereto, a duct in the member and arranged to be closed by the plate in one position of the latter, the said plate having near its movable end an arcuate slot with an offset, and a headed rivet extending through said slot and adapted to cooperate with said offset and also adapted to connect the movable portion of the plate to the member.

10. In a spring protector, the combination of a member, a resilient plate pivotally connected thereto, a duct in the member and arranged to be closed by the plate in one position of the latter, the said plate having near its movable end an arcuate slot with an offset, and a headed rivet extending through said slot and adapted to cooperate with said offset and also adapted to connect the movable portion of the plate to the member; the said duct in the member being formed by an eyelet, and the plate being provided with swell to cooperate with the rim of the said eyelet.

11. In a spring protector, the combination of a member, a resilient plate pivotally connected thereto, a duct in the member and arranged to be closed by the plate in one position of the latter, the said plate having near its movable end an arcuate slot with an offset, and a headed rivet extending through said slot and adapted to cooperate with said offset and also adapted to connect the movable portion of the plate to the member; the said duct in the member being formed by an eyelet, and the plate being provided with swell to cooperate with the rim of the said eyelet, and the plate being further provided opposite the swell with an edge notch.

In testimony whereof I affix my signature.

ALFRED R. ULP.